United States Patent [19]

Mares-Benavides

[11] Patent Number: 5,656,051
[45] Date of Patent: Aug. 12, 1997

[54] COOLING METHOD AND MOLD ARRANGEMENT FOR THE MANUFACTURE OF GLASS ARTICLES

[75] Inventor: Rafael Mares-Benavides, Monterrey, Mexico

[73] Assignee: Vidriera Monterrey, S.A., Monterrey, Mexico

[21] Appl. No.: 708,531

[22] Filed: Sep. 5, 1996

Related U.S. Application Data

[63] Continuation-in-part of Ser. No. 307,345, Sep. 9, 1994, abandoned, which is a continuation-in-part of Ser. No. 77,125, Jun. 14, 1993, abandoned.

[51] Int. Cl.$^6$ .......................................... C03B 9/24
[52] U.S. Cl. ..................... 65/66; 65/85; 65/267; 65/265; 65/356; 65/355; 249/111; 425/DIG. 19
[58] Field of Search ................ 65/319, 267, 265, 65/355, 83, 85, 66, 356; 249/111; 425/DIG. 9

[56] References Cited

U.S. PATENT DOCUMENTS

| | | | |
|---|---|---|---|
| 2,232,475 | 4/1941 | Renfrew | 425/DIG. 9 |
| 3,249,418 | 5/1966 | Irwin | 65/267 |
| 3,814,593 | 6/1974 | Parris | 65/319 |
| 4,184,865 | 1/1980 | Liebal | 65/356 |
| 4,251,253 | 2/1981 | Becker | 65/267 |
| 4,361,434 | 11/1982 | Schneider | 65/267 |
| 4,388,099 | 6/1983 | Hermening | 65/267 |
| 5,059,236 | 10/1991 | Ito | 65/319 |

*Primary Examiner*—John Hoffmann
*Attorney, Agent, or Firm*—Abelman, Frayne & Schwab

[57] ABSTRACT

The invention relates to a cooling method and a mold arrangement for the manufacture of glass articles or similar materials. The mold arrangement of this type includes a plurality of cooling passageways distributed independently and longitudinally around of the periphery of said mold, for the flow of a cooling fluid. A fluid distribution chamber coupled in coincidence with the cooling passageways, for the flow of the cooling flow, independently for each one of said passageway of the mold. A fluid regulating plate is coupled with the fluid distribution means, to regulate independently the flow of cooling in each one of the passageways of the mold, to regulate and control the cooling curve of said mold.

11 Claims, 5 Drawing Sheets

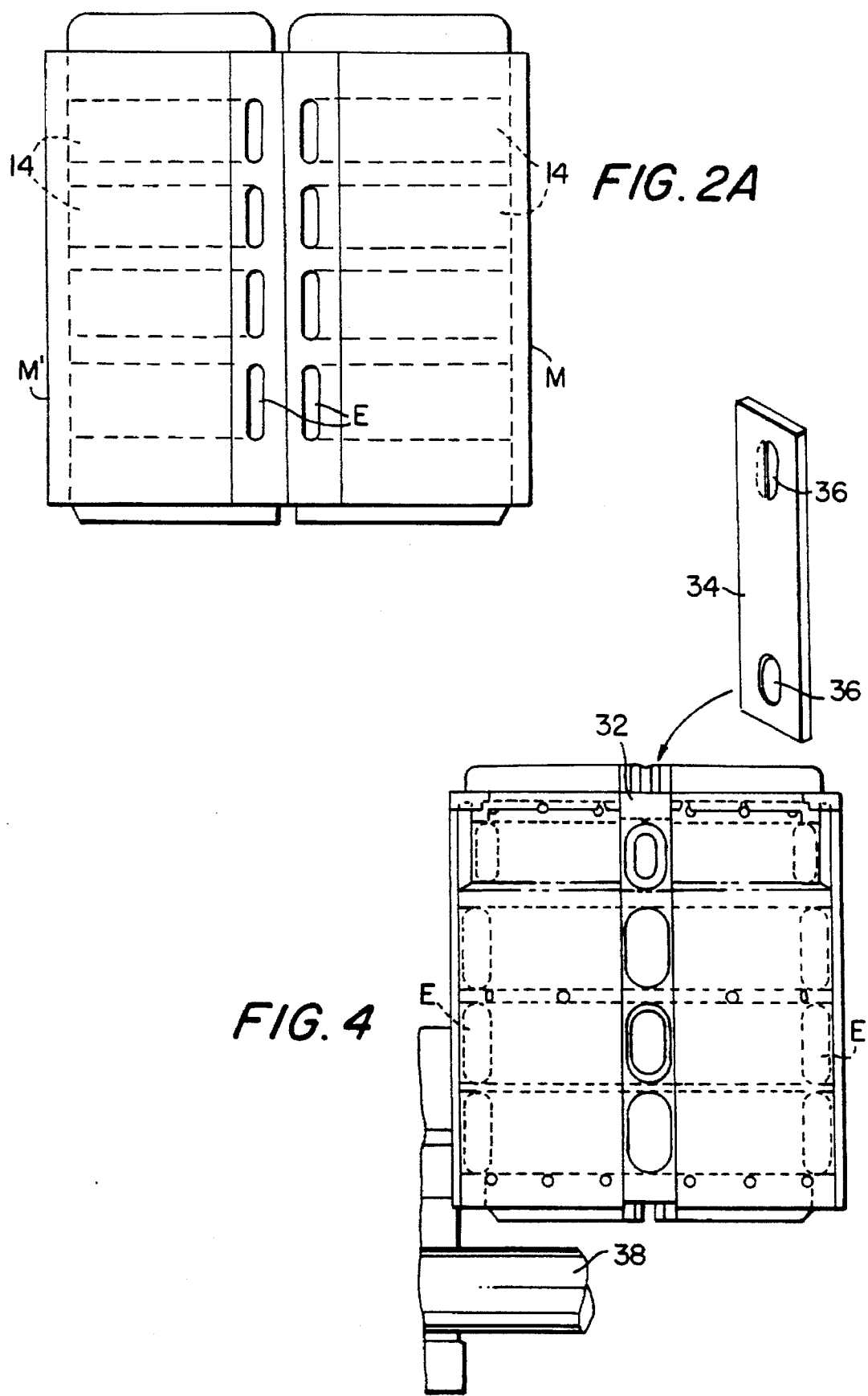

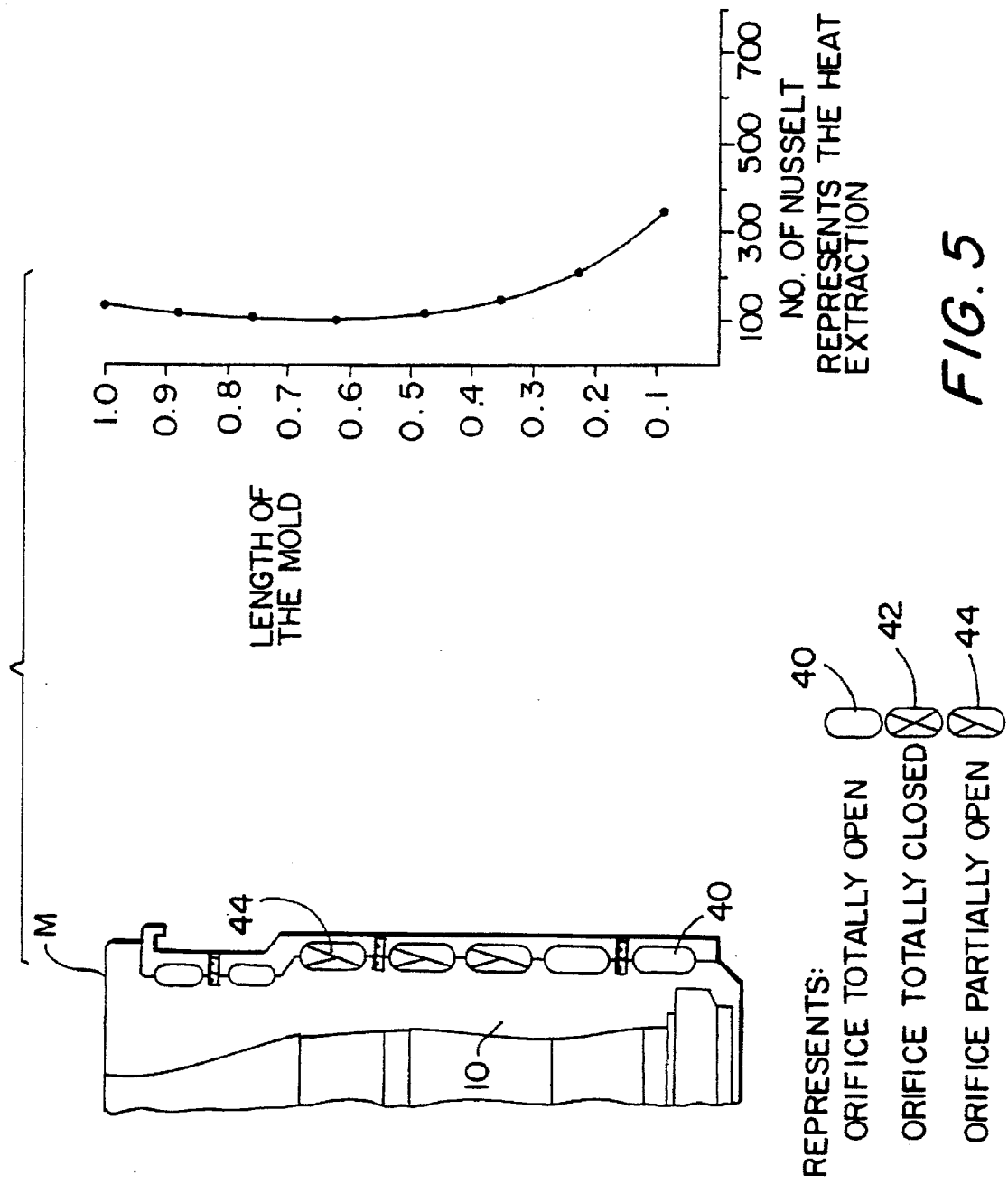

COOLING METHOD AND MOLD ARRANGEMENT FOR THE MANUFACTURE OF GLASS ARTICLES

This application is a continuation-in-part of prior application Ser. No. 08/307,345, filed Sep. 9, 1994, which is a Continuation-in-Part of Ser. 08/077,125 filed on Jun. 14, 1993, now abandoned.

BACKGROUND OF THE INVENTION

In the manufacture of glass articles in glassware forming machines, as example the one called I.S. machine, the articles are formed in molds manufactured of cast iron, regularly from "gray iron", and this is so because of this physical properties, ease of machinability, thermic conductivity and functional and economical considerations.

However, one of the main problems of the molds of the previous art is that has not been possible to uniform the transference of heat between the molten glass and the mold, which it itself produces cracks or checks of thermal origin in some sections of the formed articles and/or an uneven distribution of the glass.

This type of problem is mainly influenced by the mold's operating temperature, which must be kept in a condition of quasi-static equilibrium, this is, subject to heating-cooling cycles which maintain the ideal temperature of the mold in accordance with the type, shape and size of the article that is being manufactured.

Another problem of the molds of the previous art, is that, due to the high speed of operation of the forming machines, the molds absorb heat at a much greater speed than the dissipated heat. This implies that the mold is exposed to a, shorter time cooling period before the next gob or preform of molten glass is loaded into the molds.

At present, there already are patents for cooling systems that dissipate the heat that is absorbed by the molds during the glass article manufacturing process, for example, U.S. Pat. No. 3,666,433 of H. Nebelung et al, shows a mold that is cooled by air that includes a thermocouple located in the intermediate part of said mold and a section that is heat sensible. A control system that includes a damper valve for controlling the flow of cooling air in response to the output of the thermocouple.

Other arrangements for cooling molds, wherein the main cooling fluid is air, are described in U.S. Pat. Nos. 3,888,647 of Breden et al; 4,361,434 of Schneider; 4,388,099 of Hermening et al; 4,502,879 of Foster; 4,525,191 of Fenton; and 4,578,014 of Jones.

However, one of the main problems of the molds that are cooled with air, is that in order to effect a better heat transfer, it is necessary to increase the heat transfer area in the mold (which has been developed into very complex solutions) or in increasing the flow of the cooling air. In last case, the increase of the air speed is limited by the excessive noise that is provoked within the plant. In any case, the high speed of operation of the forming machines results in that even these solutions are not commensurate with the cooling needs required by the molds.

Notwhistanding with the above wherein is mentioned that several developments are used in order to improve the transference of heat between the glass and the mold, it is still not possible to remove or liberate the heat from the article in a uniform and controlled manner. This type of problem is partly due to the variations in thickness of the internal walls of the mold (due to the profile of the article), and this causes that the heat loss be faster in some sectors of the mold that in others. The difference in the thickness of the walls of the mold cause a different temperature profile in the article being manufactured (in a radial as well as an axial manner), which make difficult the compensation of the change which are inherent to the glass article manufacturing process, such as the change of ambient temperature, the temperature and weight of the glass, etc.

Another problem that has been present in the glass article manufacturing process is the irregularity of the walls of the glass articles.

An additional problem to those already cited is the duration of the molds. Due to the fact that the mold is exposed to rapid cooling, thermal gradients are generated and these tend to cause different dilation in keeping with the distance from the surface, and this in turn generates thermal strains in the mold's material which eventually give place to mold cracking.

Taking into account the defects of the previous art, the present invention refers to a cooling method and mold arrangement for the manufacture of glass articles or similar materials, which uniforms the heat extraction between the molten glass and said mold (the cooling being independent of the thickness of the mold's walls).

Some other advantages of the present invention are:

Improve the distribution of glass in the mold due to uniform extraction of heat.

Increase the production velocity of the articles that is being manufactured.

A greater resistance to the article's internal pressure.

A reduction of manufacturing defects due to cool or hot molds.

It provides an increased lifespan of the molds which in turn prevents areas that are overheated.

SUMMARY OF THE INVENTION

It is therefore an objective of the present invention to provide a cooling method and mold arrangement for the manufacture of glass articles or similar materials, which include a plurality of fluid cooling passageways which are distributed around the periphery of the mold; this in turn permits the presence of a uniform cooling curve around of said mold.

An additional objective of the present invention is to provide a cooling method and mold arrangement for the manufacture of glass articles or similar materials, wherein the cooling flow in each one of the cooling passageways is regulated or controlled in an independent manner.

Another objective of the present invention is to provide a cooling method and mold arrangement for the manufacture of glass articles or similar materials, wherein the cooling fluid is air.

These and other objectives and advantages of the present invention will be evident to the experts in the field with the following detailed description of the invention which is provided as a means of explanation.

BRIEF DESCRIPTION OF THE DRAWINGS

FIG. 2A is a side elevation view of the arrangement shown in FIG. 2 viewed from an angle where the exit aperture of each passageway in the mold of the present invention is visible.

FIG. 4 is a longitudinal cross-sectional view of the present invention, taken along the line B–B' of FIG. 3, showing a first embodiment of a cooling flow regulator plate to regulate the air flow in each passageway;

FIGS. 5 and 5A, are side elevation views of one sector of the mold, together with heat extraction graphs, which show cooling curves based on the regulation or control of each one of the cooling passageways of the mold.

DETAILED DESCRIPTION OF THE INVENTION

Figure 1:
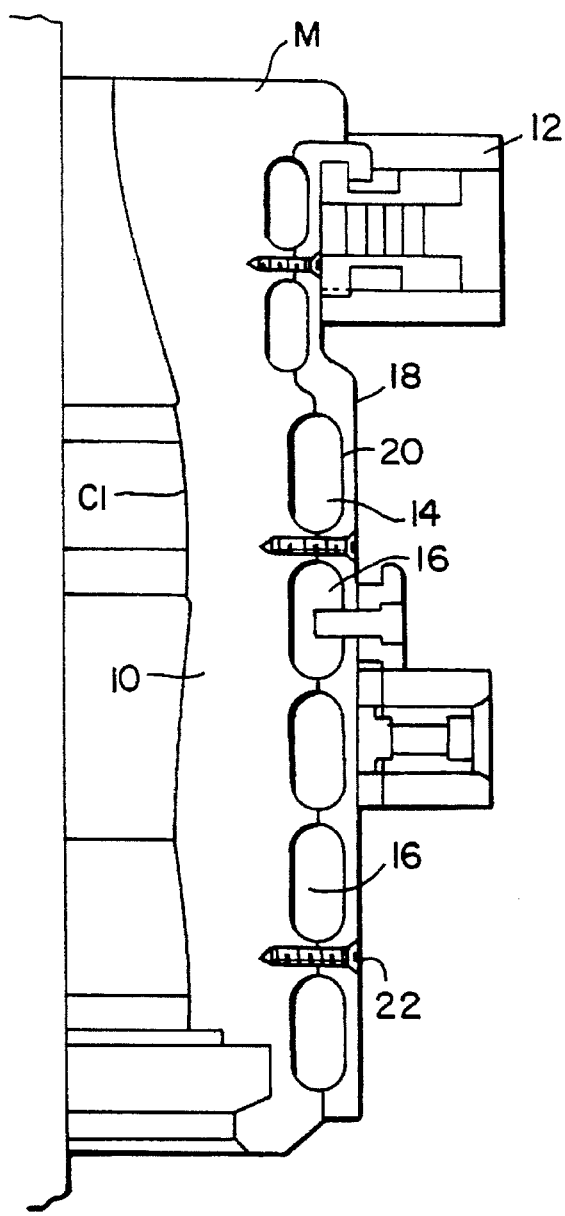
FIG. 1 is a side elevation view of a section of a glass article forming mold, which shows a plurality of the cooling passageways which are distributed around the periphery of the mold, in accordance with the present invention.

With particular reference to FIG. 1, a mold M of the type used for the manufacture of glass articles such a bottles, containers, etc., in glassware forming machines such as the already known I.S machines, which include a plurality of individual sections each one of which includes a mold M comprising two halves 10 only one half 10 is shown, which are connected to arms 12 of a mold supporting system (not shown), in order to open or close said halves 10. The halves 10 of the mold M, include an internal cavity CI, in accordance with the preform or external profile of the article.

In accordance with the present invention, each one of the halves 10 is provided with a plurality of cooling passageways 14 (FIG. 1), distributed independently around of the periphery of each half 10. Said passageways 14 can be configured in the mold M from the time in that these are east. Each half 10 is provided with a plurality of grooves 16 or another type of configuration on its external part. The number of grooves 16 can be varied depending on the type and size of the mold M.

A plate 18 having formed other serie of grooves 20, in a similar configuration to the external part of each half 10 of the mold M in order to cover each of said halves 10. In this manner, when are covered the grooves 16 with the plate 18, the plurality of cooling passageways 14 around of each half 10 are formed. In this way, each of said passageways 14 is formed with entrance apertures I and exit aperture E and can receive independently a cooling fluid, such air, for cooling radial and independently each section of the mold M.

Figure 1A:
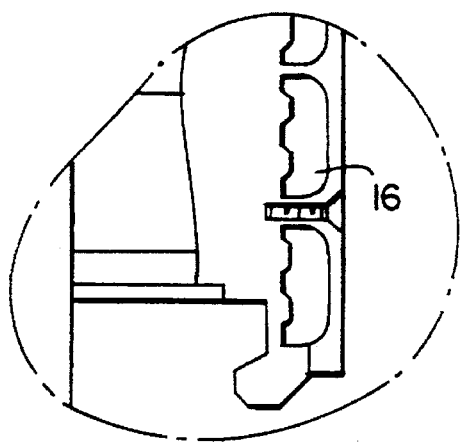
FIG. 1A. is a detailed view of a first embodiment of the shape of the cooling passageways of the mold of the present invention.

As can be seen on the FIG. 1, the attachment of the plate 18 to the mold M, is made by screws 22, which permits an interchange of said plate 18, in accordance with the form or design of the mold M. The grooves 16 of the mold M (FIG. 1A), may have different shapes in order to increase the area for the cooling of said mold M.

Figure 3:
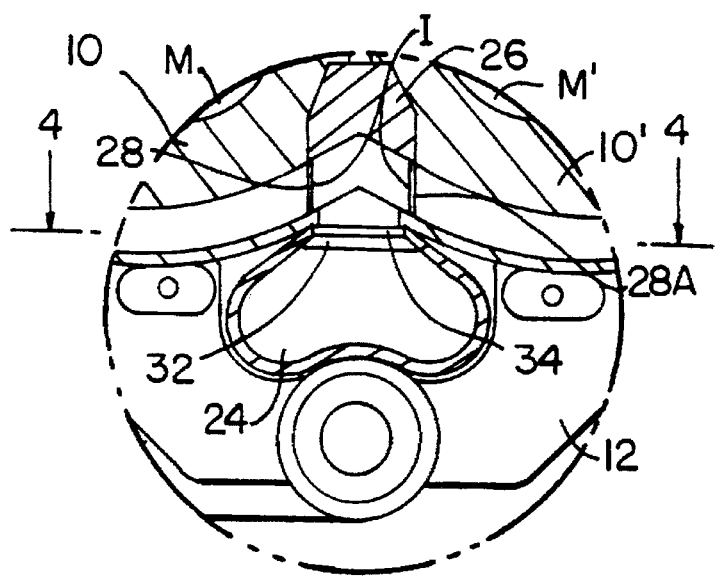
FIG. 3 is a detailed cross-sectional view of the mold arrangement of FIG. 2 taken along the line A–A' of FIG. 2.
Figure 2:
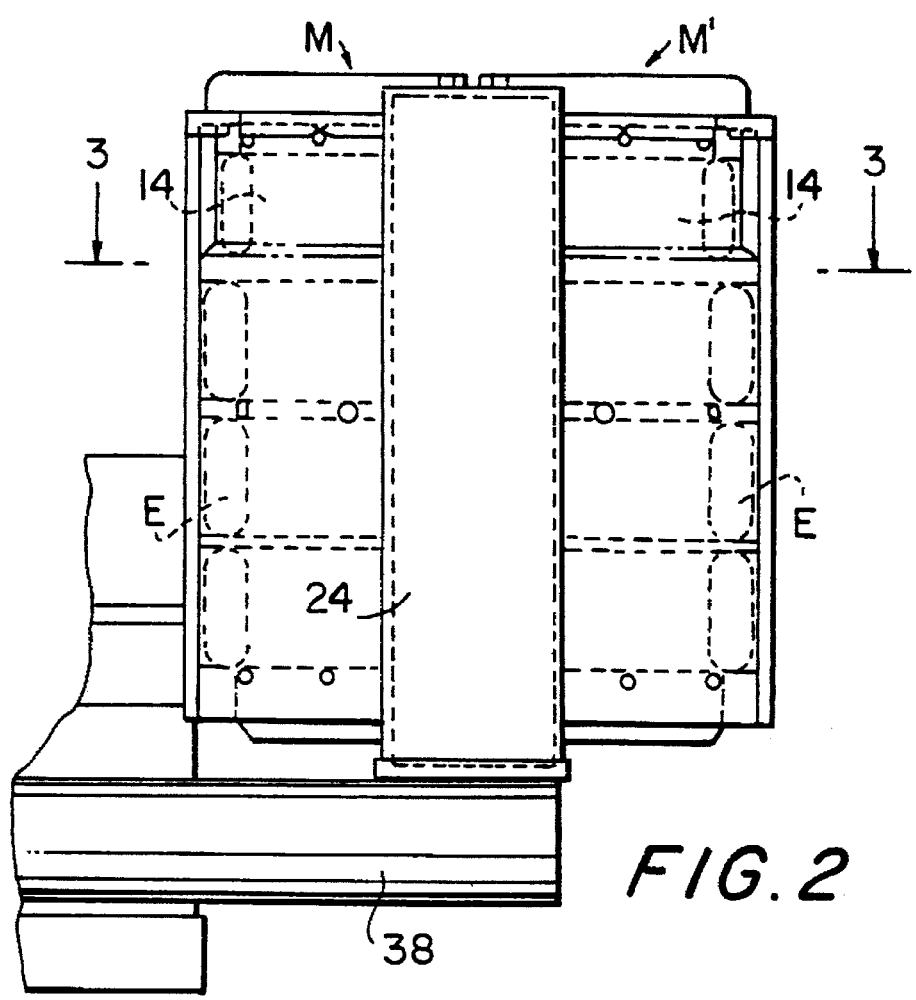
FIG. 2 is a side elevation view of an arrangement of two molds constructed in accordance with the present invention.

According to FIGS. 2, 3 and 4, a first arrangement for two molds M, M', in accordance with the present invention is showed. This arrangement comprises two identical molds M and M', arranged one beside the other. In each mold M, M' each one of the different cooling passageways 14 is showed in dotted lines.

A common feeding chamber 24 is coupled vertically in the back part of the molds M, M' to each one of the cooling passageways 14 through an air distribution chamber 26 connected to said feeding chamber 24, said air distribution chamber 26 being 26 inserted between the union of the halves 10, 10', of the molds M, M', respectively. Said air distribution chamber 26 has formed exit orifices (not shown) in both lateral sides 28, 28A, each one of said exit orifices being aligned with an entrance aperture 1 of one of the cooling passageways 14 of each half 10, 10', of the molds M, M" so that the cooling air introduced through the common feeding chamber 24 will be distributed to each cooling passageway 14 through the air distribution chamber 26.

In the detailed FIG. 3, the common feeding chamber 24 is showed as being coupled between the union of the halves 10, 10', of the molds M, M' and each one of the arms 12 (only one of the arms is illustrated) of a mold supporting system (not shown). The common feeding chamber 24 having a vertical aperture 32 in coincidence with the entrance of the air distribution chamber 26 (FIGS. 3 and 4). An cooling flow regulator plate 34 comprising a plurality of orifices 36, each orifice 36 corresponding in vertical position to a passageway 14, is inserted in a vertical position between the union of the common feeding chamber 24 and the air distribution chamber 26 in order to regulate and control the cooling curve of the molds M, M', as will be described later. Said air flow regulator 34 is interchangeable in accordance with the cooling profile for each article to be manufactured, regulating the air flow individually toward one of the cooling passageways 14.

The air supply to the cooling passageways 14 is supplied through of a duct 38 connected to the lower part of the common feeding chamber 24. However should be noted that any desired number of ducts 38 will be associated with one or more common feeding chambers 24 of each one of the molds M.

In the embodiment illustrated in FIG. 2A, 3 and 4, the cooling flow is made to pass on a continuous manner to the passageways 14, through the central part of the arrangement of a two molds. The cooling flow is provided to the mold M, M', in a continuous form, during the forming of the article and in its fully open position. By means of the above arrangement, the air flow is made to pass through of ducts 38 so, it continues on its way through of the common feeding chamber 24 and goes through of each one of the cooling passageways 14. Once the air cross the passageways 14 of each mold M, M', the air is liberated to the environment through the exit aperture E of each cooling passageway 14 of each one of the halves 10, 10', of said mold M,M', as is showed in FIGS. 2, 2A and 4.

Figure 5A:
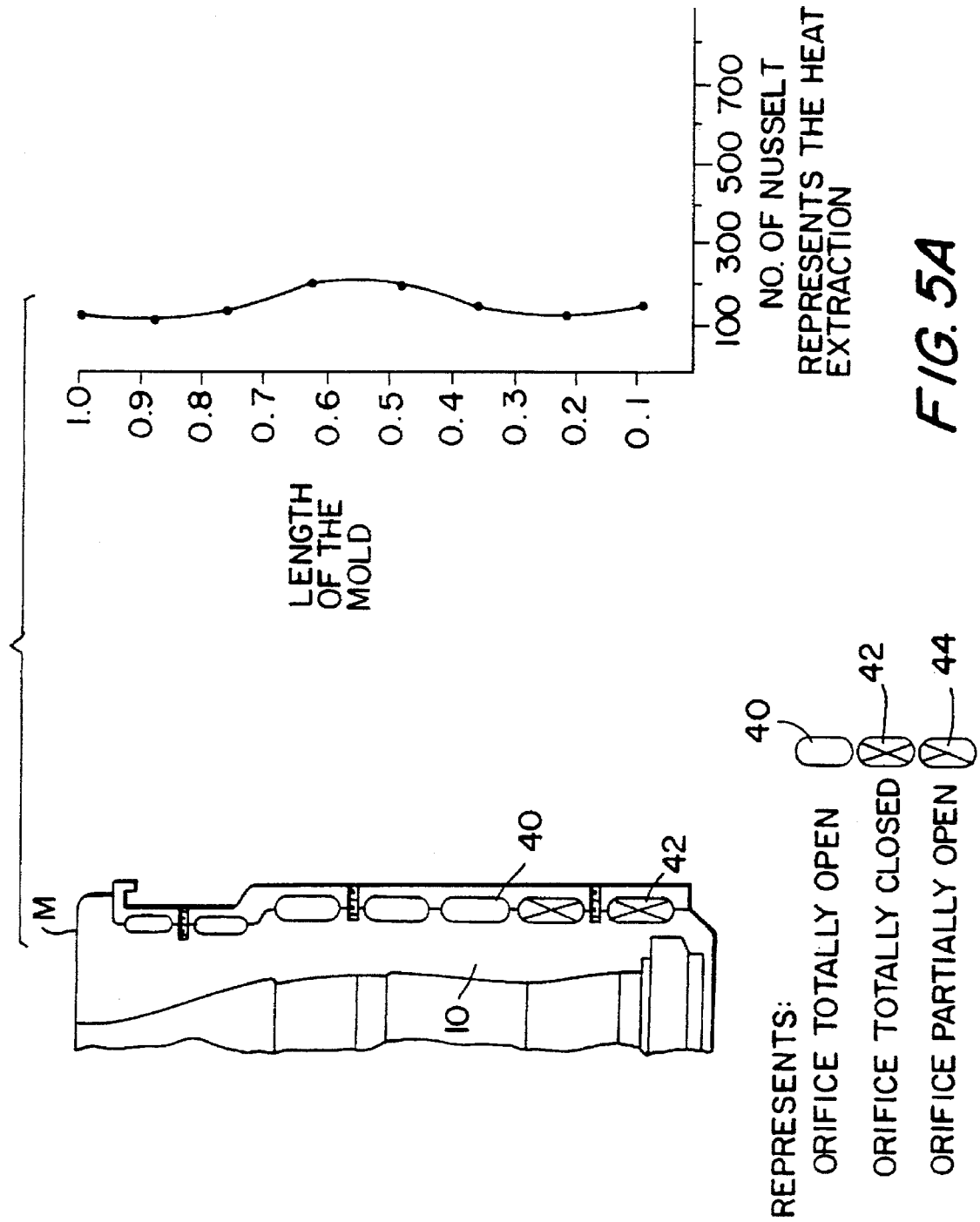

Referring now specifically to FIGS. 5 and 5A, these show graphs of heat extraction, which demonstrate, as an example, cooling curves based on the individual control of each one of the cooling passageways 14. In said FIGS. 5 and 5A, a section of mold M, is showed, wherein the cooling passageways 14 are controlled by the air flow regulator 34 with a combination of open orifices 40, closed orifices 42, and partially closed orifices 44. The corresponding graph is represented in the X axle, by the Nusslet number that measures the heat extraction and in the axle Y by the length of the mold. The different cooling curves for each mold M, are regulated by the air flow regulator 34, which are interchangeable as is showed in FIG. 4.

Finally, in an additional embodiment of the present invention, the halves 10 of the mold M can be manufactured from casting with a plurality of cooling passageways 14, of different configuration or diameters (major and minor) as is showed in FIGS. 5 and 5A, which are distributed independently around of the periphery of each half 10. The number and size of the cooling passageways 14 is previously established in accordance with the cooling curve for each mold and for each article to be manufactured. Furthermore, the number of grooves 16 can be varied depending on the type and size of the mold M.

In this additional embodiment, it will not be necessary to insert the cooling flow regulator plate 34 between the union of the common feeding chamber 24 and the air distribution chamber 26 to regulate and control the cooling curve of the molds M, M', already each mold M,M' will have its own design for each cooling curve.

As can be showed from all of the above, through the arrangement of the mod M of the present invention, the cooling profile of the wall of the recently formed glass articles can be defined or controlled. The FIGS. 5 and 5A are related with the closing or opening individual of each one of the passageways 14, in order to control and regulate the temperature of the mold M. In this manner, the slope of the cooling curve can be varied in accordance with the profile or the specific needs of the article to be manufactured.

From the above, the method for cooling a hot mold for the manufacture of glass articles of the present invention comprising:

providing a plurality of cooling passageways in a mold, each other distributed independently and longitudinally around of the periphery of said mold;

providing a cooling fluid feeding chamber near the periphery of said mold;

connecting all of the cooling passageways with said cooling fluid feeding chamber;

introducing a flow of cooling fluid through said feeding chamber causing it to flow independently through each one of the cooling passageways; and, controlling independently the cooling fluid in each of the passageways to control the cooling curve of said mold.

The method for cooling hot molds of the present invention, wherein the stage for introducing a cooling fluid to feeding chamber 24, air distribution chamber 26 and to the mold M, additionally includes: providing a continuous cooling flow to the mold, during the shaping of the article and during the open position of the molds.

Finally it should be understood that the invention is not exclusively limited to the illustrated embodiments in the above, and that it should be understood that the experts in the field can make changes in the design and distribution of the parts of the arrangement of the mold. Therefore, the present invention must not be considered to be restricted except by that which the technique requires and the spirit of the attached claims.

I claim:

1. A mold arrangement for the manufacture of glass articles which includes: at least one mold having an internal cavity configured to conform with an external profile of an article designed to be molded, said mold comprising:

a plurality of cooling passageways distributed in a longitudinal direction along a longitudinal direction of said mold, said mold having a cross-sectional area in each of a plurality of planes intersecting said longitudinal direction of said mold, said cross-sectional area having a periphery, each cooling passageway being in said mold, each cooling passageway being adjacent to all of said periphery of said cross-sectional area, each cooling passageway having a centerline in one of said plurality of planes intersecting said longitudinal direction of said mold, said cooling passageways providing a cooling fluid, each cooling passageway being capable of carrying a different rate of flow of cooling fluid from at least one other cooling passageway, each cooling passageway having an entrance aperture to introduce the cooling fluid through the mold and an exit aperture to permit an exit of the cooling fluid that has passed through said mold: and cooling fluid distribution means vertically aligned with the entrance apertures of each passageway for supplying the flow of the cooling fluid into each one of said passageways in the mold.

2. The mold arrangement for the manufacture of glass articles as claimed in claim 1, wherein said mold arrangement further includes:

cooling fluid regulating means interposed between the cooling fluid distribution means and the entrance apertures of each one of the passageways of the mold in order to regulate and control a cooling curve for the mold.

3. The mold arrangement for the manufacture of glass articles as claimed in claim 2, wherein the cooling fluid regulating means is provided with a plurality of orifices, each one of said orifices corresponding in vertical position with a different one of the cooling passageways of the mold, in order to individually control the flow of the cooling fluid in each one of the cooling passageways.

4. The mold arrangement for the manufacture of glass articles as claimed in claim 3, wherein the cooling fluid regulating means is provided with orifices of various degrees of openness ranging from totally open orifices to totally closed orifices to regulate and control the mold cooling curve along the length of the mold.

5. The mold arrangement for the manufacture of glass articles as claimed in claim 1, wherein each cooling passageway is of a different shape and size from at least one other of said cooling passageways.

6. The mold arrangement for the manufacture of glass articles as claimed in claim 1, wherein the cooling fluid distribution means comprises:

a cooling fluid feeding chamber in a vertical position in a back part of the mold and adjacent to each one of the cooling passageways; and a cooling fluid distribution chamber connected to said cooling fluid feeding chamber, said cooling fluid distribution chamber having lateral sides, said lateral sides having exit orifices aligned with each one of the cooling passageways of the mold, through which exit orifices the cooling fluid flows into each one of the cooling passageways.

7. The mold arrangement for the manufacture of glass articles as claimed in claim 1, wherein the cooling fluid is air.

8. A method for cooling a hot mold for the manufacture of glass articles comprising the steps of:

providing a plurality of cooling passageways in a mold in a longitudinal direction along a longitudinal direction of said mold, said mold having a cross-sectional area in each of a plurality of planes intersecting said longitudinal direction of said mold, said cross-sectional area having a periphery, each cooling passageway being adjacent to all of said periphery of said cross-sectional area, each cooling passageway having a centerline in one of said plurality of planes intersecting said longitudinal direction of said mold;

providing a cooling fluid feeding chamber adjacent to the periphery of said mold;

connecting each one of the cooling passageways with said cooling fluid feeding chamber;

introducing a continuous flow of a cooling fluid through said cooling fluid feeding chamber to cause a flow of the cooling fluid through each one of the cooling passageways of the mold; and controlling the flow of cooling fluid in each one of the cooling passageways independently of the flow in all the other cooling passageways to control an amount of cooling along said longitudinal direction of said mold.

9. The method for cooling hot molds as claimed in claim 8, which further includes the step of establishing the number of said cooling passageways and the shape and size of each one of said cooling passageways to control the cooling curve of the mold.

10. The method for cooling hot molds as claimed in claim 8, which further includes the step of providing a cooling fluid regulating means between the plurality of cooling passageways and the cooling fluid feeding chamber, said cooling fluid regulating means being provided with a plurality of orifices, each one of said orifices corresponding in vertical position with a different one of the cooling passageways of the mold in order to control individually the flow of the cooling fluid in each one of said cooling passageways.

11. The method for cooling a hot mold as claimed in claim 8, wherein the step that introduces the continuous flow of the cooling fluid through the cooling fluid feeding chamber comprises providing the flow of cooling fluid to the mold during forming of the article and when the mold is in an open position.

* * * * *